United States Patent [19]

McGrevy

[11] Patent Number: 5,736,171
[45] Date of Patent: Apr. 7, 1998

[54] FLUID INJECTING NOZZLE HAVING SPACED PROJECTIONS

[75] Inventor: Alan N. McGrevy, Chino, Calif.

[73] Assignee: Caco Pacific Corporation, Covina, Calif.

[21] Appl. No.: 657,279

[22] Filed: Jun. 4, 1996

[51] Int. Cl.⁶ .................................. B29C 45/20
[52] U.S. Cl. .................. 425/549; 264/328.15; 425/572
[58] Field of Search .................. 425/549, 568, 425/572; 264/328.15

[56] References Cited

U.S. PATENT DOCUMENTS

| | | | |
|---|---|---|---|
| 4,344,750 | 8/1982 | Gellert | 425/549 |
| 4,345,892 | 8/1982 | Schulte et al. | 425/549 |
| 4,492,555 | 1/1985 | Schulte | 425/549 |
| 4,981,431 | 1/1991 | Schmidt | 425/549 |
| 5,324,191 | 6/1994 | Schmidt | 425/549 |
| 5,474,439 | 12/1995 | McGrevy | 425/549 |

OTHER PUBLICATIONS

Mold–Master brochure page issued Mar. 1987.
Mold Master brochure pp. 5 and 16 issued Jan. 1992.
Husky Sealed Edge Gate brochure issued Mar. 1993.

*Primary Examiner*—Tim Heitbrink
*Attorney, Agent, or Firm*—S. L. Goldstein; Sheldon & Mak

[57] ABSTRACT

A nozzle body is provided that is equipped with a runner, passages and orifices all communicating with one another to provide a fluid delivery system to mold cavities. The nozzle body is provided with a heat insulating cap equipped with peripheral projections at spaced positions around the outside wall of the cap so that the fluid injected into the mold at the gatewell will shear with a smooth cleavage after solidifying to provide a smooth separation surface on the molded part. Each gatewell is disposed in a peripheral projection in the cap and the peripheral projection is spaced of few thousandths from the mold. The cap serves to minimize the loss of heat from the nozzle body by aligning and centering the cap and the nozzle body relative to the gatewells leading to the mold.

33 Claims, 2 Drawing Sheets

FLUID INJECTING NOZZLE HAVING SPACED PROJECTIONS

This invention relates to apparatus for injecting fluid into molds to form articles corresponding to the cavities in the molds. The invention particularly relates to apparatus for accurately and reliably reproducing articles in molds.

BACKGROUND OF THE INVENTION

Articles are often formed by injecting heated fluid into molds. The fluid is introduced into a runner in a nozzle body. The fluid then flows from the runner through passages in the nozzle body and through gate wells into hollow cavities in the molds. The fluid is heated as it flows through the passages. When the fluid has solidified in the hollow cavities in the molds, the solidified article is sheared at the positions where the fluid flows through the gate wells into the hollow cavities in the molds.

Articles have been formed for decades, if not centuries, by injecting fluid into hollow cavities in molds. In all of this period of time, certain problems have continued to exist in spite of considerable efforts during this period to resolve such problems. For example, at the position where the fluid flows from the gate well in the nozzle body into the hollow cavity in the mold, a scar is formed in the smooth periphery of the article when the article is sheared at the gate well after the article has solidified.

There are other unresolved difficulties in the injection molding of articles. For example, it has been difficult to simultaneously form a plurality of articles satisfactorily from fluid flowing through a plurality of passages in a single nozzle body. It has also been difficult to form articles of a first particular color with a minimal effort in a mold immediately, or even shortly, after articles of a second color have been previously formed in the mold. The fluid remaining in the nozzle body with the second color tends to contaminate the fluid of the first color for an extended period of time after the fluid of the first color has been introduced into the nozzle body.

U.S. Pat. No. 5,474,439 discloses apparatus which significantly resolves satisfactorily the problems discussed in the previous paragraphs. For example, a single nozzle body is able to inject fluid simultaneously into a plurality of mold cavities to obtain the simultaneous formation of articles in the mold cavities. The single nozzle body also provides for the formation of articles which have a smooth peripheral surface when the articles are sheared from the gate well in the nozzle body after they have solidified in the mold. The single nozzle body is also advantageous in that an article of a first color can be produced without color contamination by the passage of fluid of that color through the nozzle body shortly after a fluid of a different color has previously passed through the nozzle body.

In the embodiment of U.S. Pat. No. 5,474,439 issued to me on Dec. 12, 1995, and assigned of record to the assignee of record of this application, a nozzle body has a runner, a passage and a gate well, all communicating with one another, to provide for fluid flow into and through the nozzle body. The fluid is heated during its flow through the nozzle body by disposing an electrical heater on the nozzle body and by extending a heat conductive plug (e.g. copper) through the nozzle body.

A cap made from a heat insulating material (e.g. titanium) and disposed in a tight fit on the nozzle body in the embodiment of U.S. Pat. No. 5,474,439 has gate wells for receiving the fluid in the orifices and for injecting such fluid into molds. The cap is constructed so that fluid cannot leak into the area around the cap when heated fluid flows through the gate wells. The cap is also constructed so that the article formed in the mold from the fluid injected into the mold will shear to provide a smooth surface at the shear position when the article is ejected from the mold after the fluid has solidified.

Fluid leakage is prevented in the embodiment of U.S. Pat. No. 5,474,439 by forming a first peripheral portion in the cap around the orifice and by disposing the cap so that the first peripheral portion is close to, but separated from, the mold when cold and expands with heat into even closer, but spaced, relationship with the mold. Second portions displaced along the periphery of the cap from the first portion are contiguous to the mold with the cap cold and abut the mold when the cap is hot. Indentations in the cap periphery between the first and second portions insulate the second portions from the first portion.

BRIEF DESCRIPTION OF THE INVENTION

In one embodiment of the invention, a nozzle body has a runner, passages and orifices all communicating with one another to provide for fluid flowing to and through the body. The fluid is heated during its flow by an electrical heater on the body and by conductive plugs (e.g. copper) each extending through the nozzle between an adjacent pair of passages.

A heat insulating cap (e.g. titanium) tightly fitted on the body has gate wells for injecting fluid from the orifices into mold cavities. A dowel extending from the cap bottom surface into the nozzle body aligns the orifices and the adjacent gate wells. Screws extend upwardly into the nozzle body from the cap bottom surface to position the cap fixedly relative to the nozzle body.

The cap is provided with projections at spaced positions around the annular periphery of the cap so that (1) fluid in the gate wells cannot leak into the area around the cap and (2) fluid injected into the mold will shear, after solidifying, to provide a smooth peripheral surface when ejected from the mold.

The annularly spaced projections on the cap center the cap and the nozzle body relative to the molds, align the gate wells with the orifices and the gate cavities and minimize the loss of heat from the nozzle body through the cap and into the molds.

DETAILED DESCRIPTION OF THE INVENTION

Figure 1:
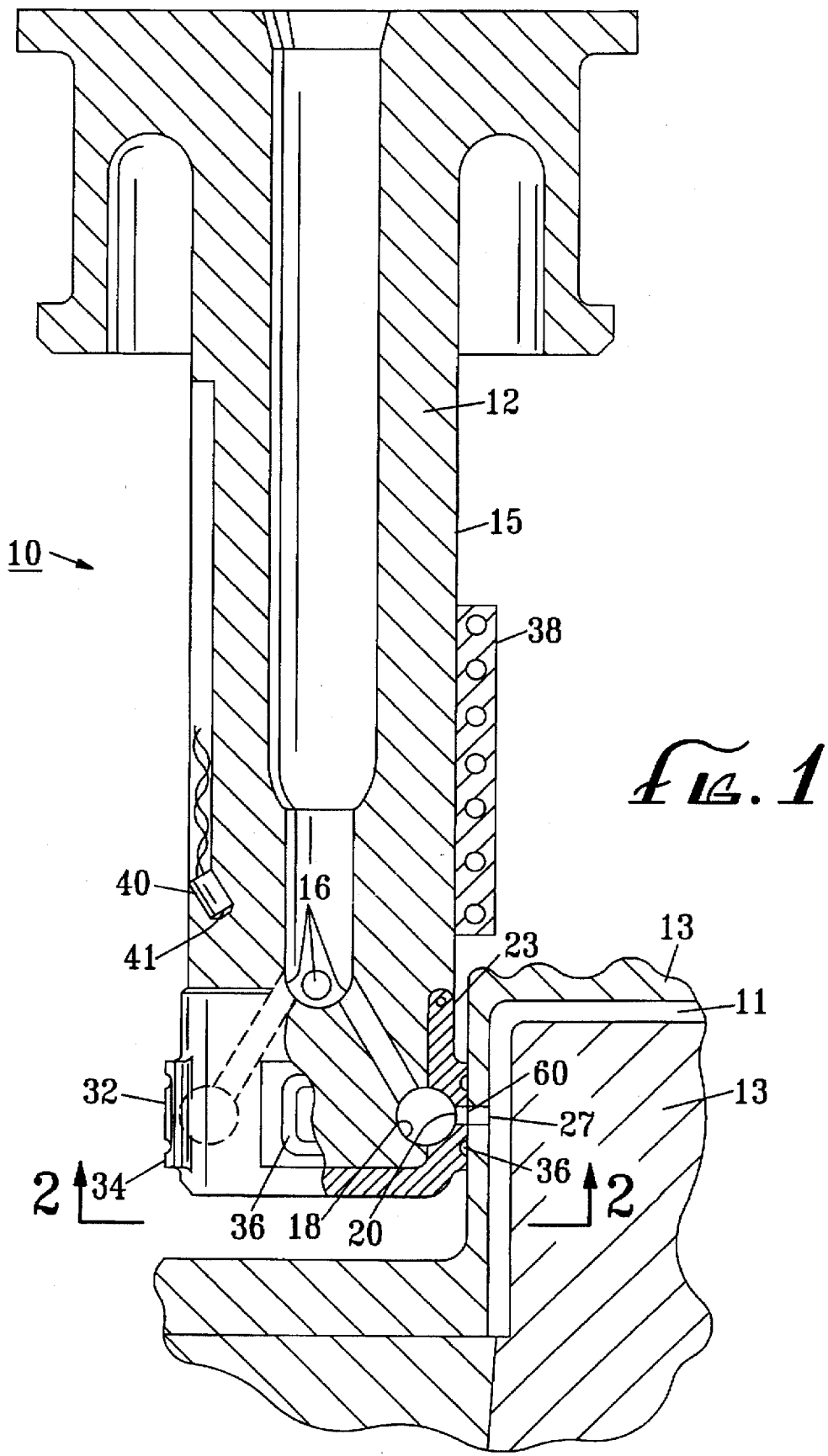
FIG. 1 is a sectional view illustrating one embodiment of apparatus for injecting fluid into a mold cavity, such apparatus including a nozzle body and a heat insulating cap on the nozzle body.
Figure 2:
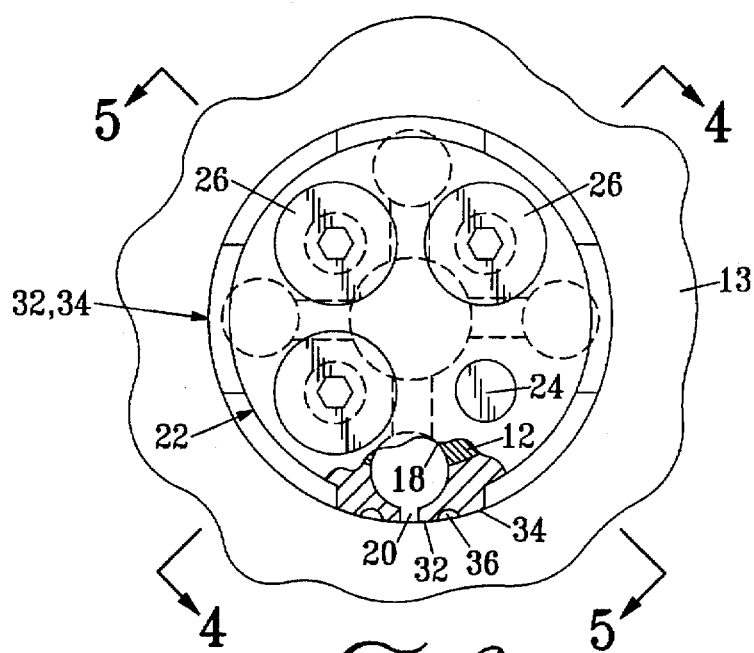
FIG. 2 is a sectional view taken substantially on the line 2—2 of FIG. 1 and shows an arrangement for disposing the nozzle body in a concentric and heat insulating relationship with the cap.
Figure 3:
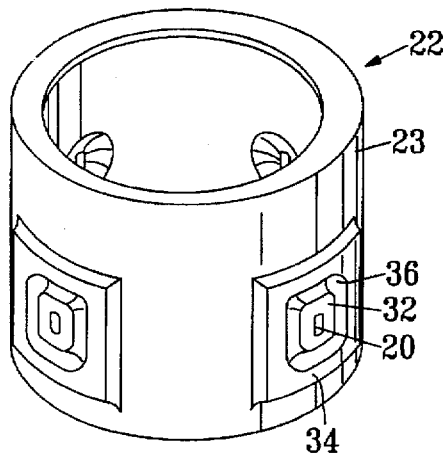
FIG. 3 is an enlarged perspective view of the cap and shows projections at spaced positions around the annular periphery of the cap.
Figure 4:
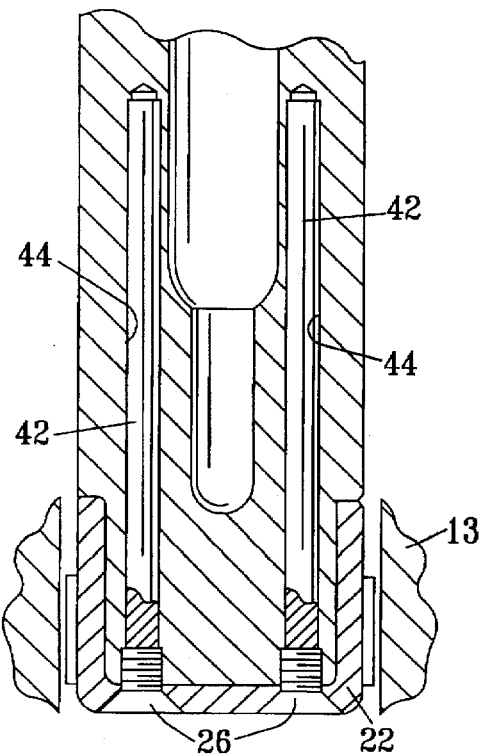
FIG. 4 is a sectional view taken substantially on the line 4—4 of FIG. 2 and shows the disposition of a cap on a nozzle body in the injecting apparatus.
Figure 5:
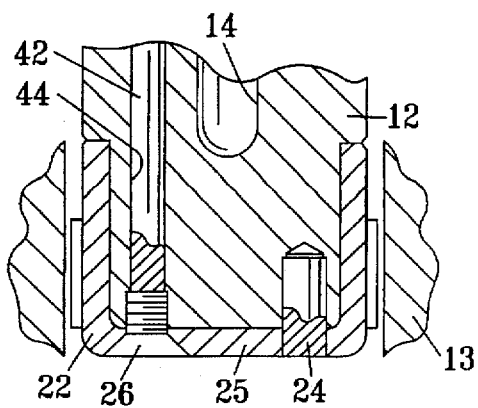
FIG. 5 is a sectional view taken substantially on the line 5—5 of FIG. 2 and shows additional features relating to the disposition of the cap on the nozzle body in the injecting apparatus.

Apparatus constituting one embodiment of the invention is generally indicated at 10 for injecting fluid into a cavity 11 of a mold 13. The apparatus 10 includes a nozzle body 12 made from a suitable material such as steel and having a runner 14 for receiving the fluid. The nozzle body 12 has an external surface 15 which is preferably annular. The runner 14 communicates with a plurality of passages 16 each displaced angularly from the other. Each of the passages 16 communicates with an individual one of a plurality of orifices 18.

Each of the orifices 18 in turn communicates with a gate well 20 in a cap 22 which may be made from a suitable insulating material such as titanium. The cap 22 has a body with a side wall 23 which may be tightly disposed on the nozzle body 12 as by heating the cap and then disposing the cap on the nozzle body while still hot. The cap 22 is properly disposed on the nozzle body 12 with each gate well 20 in alignment with the adjacent orifice 18. This is accomplished by disposing a dowel 24 in a socket in the nozzle body 12 and a bottom wall 25 of the cap 22. The cap 22 may be secured to the nozzle body 12 in such aligned relationship by disposing screws 26 in threaded sockets in the bottom wall of the nozzle body 12.

The fluid passing through the gate wells 20 are injected into the cavities 11 in the molds 13. Each of the cavities 11 has an opening 27 which is disposed in horizontal alignment with an associated one of the gate wells 20. Each gate well 20 is disposed in a peripheral projection 32 in the cap 22. Each peripheral projection 32 is spaced by a few thousandths of an inch from the associated mold 13 before fluid flows through the gate well 20 into the associated mold cavity. For example, this spacing may be approximately two to three thousandths of an inch (0.002"–0.003") when the cap is cold.

When heated fluid flows through the gate well 20 into the associated mold cavity 11, the cap 22 expands at the position of the projection 32 so that the projection is even closer to the associated mold. The separation between the peripheral projection 32 and the associated mold 13 may then be a suitable distance such as approximately four thousandths of an inch (0.004").

The cap 22 may be formed from a suitable material such as a Beta C titanium which is preferably heated to approximately a 43-48 Rockwell hardness. Beta C Titanium is desirable because it has a good memory. This causes the cap 22 to expand when heated and to retract into its original configuration when cooled. This is important in retaining the cap 22 in an annular configuration when cooled and in a centered relationship to the molds 13 when cooled. However, it should be appreciated that the cap 22 may be formed from other materials such as a ceramic or a steel.

Projections 34 are provided on the external surface of the cap 22 at spaced positions around the annular periphery of the cap 22. The projections 34 are contiguous to, but spaced from, the associated molds 13. For example, four (4) projections may be disposed around the annular periphery of the cap 22, each projection being displaced by an angle of 90° from the adjacent projections. The projections 34 are contiguous to, but spaced from, the associated mold 13 in a radial direction. For example, the radial spacing between the projections 34 and the associated molds 13 may be approximately two thousandths of an inch (0.002"). In effect, the projections 34 are so close to the associated molds 13 that they serve as elements for positioning the cap 22 in the desired relationship with respect to the associated molds 13. When the projections 34 become heated, they expand into substantially abutting relationship with the associated mold 13.

The cap 22 is indented as at 36 at positions between each of the projections 32 and each of the adjacent projections 34. Each of the indentation 36 is defined by a rectangular ring. The indentations 36 define air gaps for maintaining the projections 34 substantially at ambient temperatures even when heated fluid is flowing through the gate wells 20. The air gap defined by each indentation 36 envelopes the adjacent projection 32 and separates such projection from the adjacent projection 34 at every position through an angle of 360°. In this way, the projections 34 maintain the desired spaced relationship between the projections 32 and the associated mold 13 under all circumstances.

A heater band 38 is supported by the nozzle body 12 to heat the nozzle body. The heating may be regulated by a thermocouple 40 disposed in a socket 41 in the nozzle body 12. Plugs 42 are disposed in sockets 44 in the nozzle body 12. The plugs 42 extend to a position contiguous to the passages 16 to heat the fluid flowing through the passages. The plugs may be formed from a suitable heat conducting material such as copper.

Fluid is introduced into the runner 14 in the nozzle body 12. The fluid flows through the passages 16, the orifices 18 and the gate wells 20 into the cavities 11 in the molds 13. The fluid is heated by the heat directed through the plugs 42 as a result of the flow of current through the heater band 38. The heat from the heater unit causes the projections 34 to expand so that they abut against the adjacent molds 13. This prevents fluid from leaking along the periphery of the cap 22 as the fluid flows through the gate wells 20 in the cap and the cavities 11 in the molds 13.

When the articles formed in the molds have solidified, they are sheared at a position 60 in FIG. 1. This causes the formed articles to have a smooth exterior surface. The shearing of the articles at the position 60 is facilitated by the projections 34 and 36 since these projections maintain the gate wells 20 in the caps 22 in alignment with the openings 27 in the cavities 11 and enhance the ease at which the articles are sheared at the position 60. Furthermore, because of the abutting relationship between the projections 34 and the molds 13 when the articles are sheared after solidifying in the molds, the molten fluid is not able to leak along the periphery of the cap 22.

The production of smooth surfaces on the molded articles at the positions of the shear is enhanced by the retention of the projections 34 at substantially ambient temperatures. This is obtained in part because of the cooling action of the air in the air gaps defined by the indentations 36 between the projections 32 and the projections 34. It is also obtained in part because the solidified fluid in the space between the opposite ends of each projection 34 in the axial direction along the cap 22 constitutes a heat insulator and confines the fluid only in the area of the gate wells 20 in the cap. By providing the slight expansion of the projections 34 at the elevated temperatures of the fluid flowing through the gate wells 20, the projections 34 provide stable platforms for controlling the disposition of the projections 32 relative to the molds 13. This facilitates the clean shearing of the articles at the positions of the gates 20.

The provision of the projections 34 at spaced positions on the cap 22 in the annular direction also provides certain important advantages. The projections 34 cause the cap 22 to be centered relative to the molds 13 so that the passages 16 and the orifices 18 in the nozzle body are aligned with the gate wells 20 in the cap 22. Furthermore, the minimal areas of contact between the projections 34 and the molds 13 at elevated temperatures cause a minimal amount of heat to be transferred from the cap 22 to the molds 13. Because of this, substantially all of the heat generated in the nozzle body 12 can be used in heating the fluid in the passages 16. This assures that the fluid will be in a molten state as it passes into the cavities 11 in the molds 13 through the passages 16 and the orifices 18 in the nozzle body 12 and through the gate wells 20 in the cap 22.

The apparatus constituting this invention also has other important advantages. In the apparatus constituting this invention, the different projections 34 are maintained in an annular relationship. This results in part from the additional strength imparted to the cap 22 by the bottom wall 25 of the cap. This additional strength prevents the cap 22 from becoming off-round even when forces are applied to the cap in a direction transverse to the annular periphery of the cap. Since the cap 22 cannot become off-round, the gate wells 20 in the cap 22 are maintained in aligned relationship with the openings 27 in the cavities 11.

The apparatus constituting this invention also has other important advantages. It provides for the simultaneous formation of articles in a plurality of molds. It also facilitates a quick change in the colors in which the articles can be formed in the molds 13. For example, the articles may be initially formed in a red color and then in a blue color. The change from the red color to the blue color can be accomplished in a minimal period of time without even removing the apparatus 10 from its optimal position relative to the molds 13.

The fluid injecting apparatus of this invention also has other important advantages. It provides for a purging of fluid of a first color (e.g. red) in a relatively few cycles of operation after fluid of a second color (e.g.) blue is introduced into the runner 14 in the nozzle body 12. The change in color of the molded articles can be provided without removing any component, including the nozzle 10 or the cap 22, from the apparatus and without performing any work on the apparatus other than to insert the fluid of the second color (e.g. blue) in the nozzle body.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

I claim:

1. A nozzle for transporting molten material to a cavity in a mold through an opening in the mold, including, a nozzle body, there being a runner in the nozzle body for the introduction of the molten material into the nozzle body, there being an orifice in the nozzle body in communication with the runner in the nozzle body, a heat insulating cap on the nozzle body, the heat insulating cap having a gate well communicating with the orifice in the nozzle body for the flow of the molten material through the orifice and the gate well, the heat insulating cap being constructed to provide a shearing of the article from the mold with a smooth surface at the shearing position after the solidification of the article in the mold, first means extending between the nozzle body and the cap for aligning the nozzle body and the cap to provide for the communication between the gate well in the cap and the orifice in the nozzle body, the heat insulating cap has a side wall and a bottom wall, second means extending from the cap to the mold at spaced positions around the periphery of the cap to position the cap relative to the mold and to provide for a maximal heat in the molten material flowing through the passage into the cavity in the mold, and means for heating the molten material in the passage.

2. A nozzle as set forth in claim 1 for use with a plurality of spaced molds each having a cavity, including;

there being a plurality of passages in the nozzle body at spaced positions around the runner in the nozzle body, and the second means including a plurality of projections extending from the side wall of the cap at spaced positions around the periphery of the cap to center the projections relative to the mold and to provide for the flow of the molten material through the passages into the cavities in the molds, each of the projections extending from the side wall of the cap at a position corresponding to the portion of an individual one of the adjacent passages.

3. A nozzle as set forth in claim 1, including;

the heating means including a plug disposed in the nozzle body relative to the passage in the nozzle body for directing heat through the passage.

4. A nozzle as set forth in claim 2, including;

the heating means including a plurality of plugs disposed in the nozzle body relative to the passages in the nozzle body for directing heat through the passages to the projections.

5. A nozzle as set forth in claim 1, including;

the heat insulating cap having a body and the projection constituting a first projection and extending from the body in a first direction, the orifice extending through the heat insulating cap to the first projection, the first projection surface being expansible to abut the mold after increases in the temperature of the cap as a result of the formation of the article in the mold, the heat insulating cap having a second projection extending in the first direction and being displaced from the first projection along the mold in a second direction transverse to the first direction to provide an air gap between the first projection and the second projection even after increases in the temperature of the cap as a result of the formation of the article in the mold, the second projection being disposed closer to the gate well in the cap then the first projection surface.

6. A nozzle as set forth in claim 5, including, the first and second projections being disposed in the first direction to provide a spacing between each of the first and second projections and the mold when the molten material in the passage is not being heated.

7. A nozzle as set forth in claim 1, including, the molten material flowing in a particular direction into the opening in the mold through the gate well in the cap, the heat insulating cap having a plurality of projections displaced from one another in a direction transverse to the particular direction to provide for the formation of the article in the mold with an extension only at the position of the gate well and to provide for the breakage of the article from the mold as the position of the gate well with a configuration corresponding to the configuration of the mold.

8. A nozzle as set forth in claim 7, including, means for heating the nozzle body, and a heat conductive member disposed in the nozzle body and extending to a position contiguous to the molten material flowing from the runner and through the orifice in the nozzle body to heat the molten material as the molten material flows from the runner into the orifice.

9. A nozzle for transporting molten material to a cavity in a mold through an opening in the mold, including, a nozzle body, a runner in the nozzle body, there being a passage in the nozzle body in communication with the runner, there being an orifice in the nozzle body in communication with the passage, first means disposed on the nozzle body for introducing heat into the nozzle body, second means disposed in the nozzle body for directing to the passage the heat introduced into the nozzle body, and heat insulating means disposed on the nozzle body and including a gate well in communication with the orifice in the nozzle body for passing the molten material from the orifice in the nozzle body to the opening in the mold, the heat insulating means being constructed and disposed relative to the mold for providing a communication of the molten material between the nozzle body and the mold substantially only through the gate well in the heat insulating means and the opening in the mold to provide for a shearing of the article in the mold from the nozzle body, after solidification of the molten material, at substantially only the gate well in the heat insulating means, the heat insulating means including at least one projection extending from the heat insulating means to a position in contiguous relationship with the mold for passing the molten material through the nozzle body and the passage into the projection in the heat insulating means and for maintaining the heat insulating means in abutting relationship with the mold when the projection becomes heated by the molten material.

10. A nozzle as set forth in claim 9, there being a plurality of passages around the runner in the nozzle body and in communication with the runner and in spaced positions relative to one another, there being a plurality of orifices in the nozzle body, each of the orifices being in communication with an individual one of the passages, there being a plurality of projections disposed in spaced positions around the external periphery of the heat insulating means the first means including a plurality of plugs each disposed to direct heat to individual ones of the passages.

11. A nozzle as set forth in claim 9, including, the projection constituting a first projection the first projection being defined by a pair of spaced portions disposed on opposite sides of the opening in the mold and contiguous to, but separated from, the mold when cold and expansible into abutting relationship with the mold when heated.

12. A nozzle as set forth in claim 10, including, the projection being constructed and disposed relative to the mold to prevent leakage of the molten material in the area around the gate well in the heat insulating means as the molten material passes from the gate well in the heat insulating means to the opening in the mold.

13. A nozzle as set forth in claim 10, there being a plurality of projections around the external periphery of the cap at spaced positions around the external periphery of the cap for disposition in contiguous relationship to a plurality of molds, the projections constituting first projections, and a plurality of second projections disposed on the cap at spaced positions around the periphery of the cap in spaced and insulating relationship to the first projections.

14. A nozzle for transporting molten material to a cavity in a mold through an opening in the mold, including, a nozzle body, a runner in the nozzle body, there being a passage in the nozzle body in communication with the runner, there being in the nozzle body an orifice in communication with the passage, first means disposed on the nozzle body for introducing heat into the nozzle body, second means disposed in the nozzle body for directing to the passage the heat introduced into the nozzle body, heat insulating means disposed on the nozzle body and including a gate well in communication with the orifice in the nozzle body for passing the fluid from the nozzle body to the orifice in the mold, the heat insulating means being constructed and disposed relative to the mold for providing a communication of the fluid between the cap and the mold substantially only through the gate well in the heat insulating means and the orifice in the mold to provide for a shearing of the article in the mold, after solidification, from the nozzle body at substantially only the gate well in the heat insulating means, and a plurality of third means disposed on the heat insulating means and extending from the heat insulating means in a first particular direction for aligning the nozzle body and the heat insulating means to provide for the communication between the orifice in the nozzle body, the gate well in the heat insulating means and the opening in the mold, and fourth means disposed on the heat insulating means and extending from the heat insulating means toward the mold at spaced positions around the heat insulating means in a second particular direction transverse to the first particular direction for aligning the heat insulating means relative to the mold with the heat insulating body spaced from the mold in the second particular direction except at the positions of the fourth means.

15. A nozzle as set forth in claim 14, wherein, the fourth means includes a plurality of projections disposed on the periphery of the heat insulating means at spaced positions around the periphery of the heat insulating means for aligning the heat insulating means relative to the mold in the second particular direction.

16. A nozzle as set forth in claim 15, including the heat insulating means constituting a cap having an annular periphery and the projections extending from the annular periphery of the heat insulating means at spaced positions around the annular periphery of the heat insulating means.

17. A nozzle as set forth in claim 14, including, the heat insulating means constituting a cap having an external annular surface, and the fourth means constituting projections extending radially from the annular external surface of the cap at spaced positions around such external annular surfaces to center the nozzle body and the cap relative to the mold.

18. A nozzle as set forth in claims 17, including, the heat insulating means including a gate well in communication with the orifice in the nozzle body for passing the molten material from the passage the nozzle body to the opening in the mold, the third means having a periphery with a portion displaced from the mold when cold and expansible against the mold when heated for preventing the molten material from leaking along the periphery of the heat insulating means to the opening in the mold and the fourth means having a periphery with second portions disposed on the opposite sides of the first portion and separated from the third and separated from the mold when cold and expansible into contiguous, but spaced, relationship with the mold when heated.

19. A nozzle as set forth in claim 18, including, the periphery of the heat insulating means also including third portions each disposed between the first third means and an individual one of the fourth means along the periphery of the heat insulating means and shaped to heat insulate the heat insulating means from the mold and to insulate the third means from the fourth means.

20. A nozzle as set forth in claim 19, the third portions defining air gaps between the first portion and the second portions.

21. A nozzle as set forth in claim 18, including, the first portion being disposed in abutting relationship to the mold when heated and the third portions defining air gaps between the and the fourth portions even when the heat insulating means is heated.

22. A nozzle as set forth in claim 19, including, the second portions being constructed to be spaced from the mold when the heat insulating means is at ambient temperatures and to become displaced into close, but spaced relationship with the mold when the heat insulating means becomes heated.

23. A nozzle as set forth in claim 17, including, heat conductive means extending from the heating means to the passage to introduce heat to the molten material flowing through the passage.

24. A nozzle for transporting molten material to a cavity in a mold through an opening in the mold, including, a nozzle body, there being a runner in the nozzle body, means for applying heat to the nozzle body, there being an orifice in the nozzle body in communication with the runner in the nozzle body and in communication with the opening in the mold, a plug extending through the nozzle body to heat the molten material in the runner, the plug being made from a heat conductive material, and a cap made from a heat insulating material, the cap being disposed on the nozzle body at the end opposite the runner and being provided with a gate well in communication with the orifice, the gate well being disposed in the cap to inject into the opening in the mold the molten material flowing through the gate well, means disposed at the end of the cap opposite the runner for disposing the gate well in communication with the orifice, the cap being provided with a side wall for enveloping the nozzle body, and at least one projection extending from the cap for positioning the cap relative to the mold to provide the communication between the gate well and the orifice and to provide for the passage of heat from the plug through the passage in the nozzle body while minimizing the passage of heat from the cap.

25. A nozzle as set forth in claim 24, the cap having an annular external periphery, there being a plurality of projections, including the at least one projection, disposed in annularly spaced relationship to one another around the annular periphery of the cap and extending between and the cap and the mold for positioning the cap and the nozzle body relative to the mold to center the nozzle body and the cap relative to the mold.

26. A nozzle as set forth in claim 24 wherein which the projection is disposed in a ring around the orifice in the cap.

27. A nozzle as set forth in claim 24, the projection being contiguous to, but separated from, the mold when cold and expansible into abutting relationship with the mold when heated.

28. A nozzle as set forth in claim 25, there being a plurality of molds disposed in spaced relationship around the annular periphery of the caps, there being in the nozzle body a plurality of orifices disposed in spaced relationship around the periphery of the runner and in communication with the runner and the openings in the molds, the cap having a plurality of gate wells each communicating with an individual one of the orifices, there being a plurality of plugs each extending through the nozzle body at spaced positions in the nozzle body to heat the molten material flowing through the runner, the plugs being made from a heat conductive material, there being a plurality of projections each extending from the cap at spaced positions around the annular periphery of the cap for centering the cap and the nozzle body relative to the molds to provide the communication between the gate wells and the orifices and to provide for the passage of heat from the plugs through the passages in the and the projections in the cap and to provide for a minimal loss of heat from the cap to the molds.

29. A nozzle as set forth in claim 27, wherein the orifices extend from the external periphery of the nozzle body to the gate wells and wherein the projections envelope the gate wells.

30. A nozzle as set forth in claim 24, including, the plug being made from copper, and the cap being made from titanium, the portions of the projections contiguous to the gate well being disposed in contiguous, but spaced, relationship with the molds when cold and in substantially abutting relationship with the molds when heated.

31. A nozzle as set forth in claim 24, including, the cap being formed to dispose the cap in contiguous, but spaced, relationship to the mold at the position of the orifice in the cap upon the passage of heated fluid through the gate well and the opening in the orifice and to provide heat insulation between the mold and the cap at positions displaced along the cap from the gate well, the cap being separated from the mold at positions between the orifice and the spaced portions to define heat insulating portions for controlling the heat passing to the spaced portions.

32. A nozzle as set forth in claim 24, including, the cap being formed at positions between the spaced portions, and being disposed relative to the mold at the positions between such spaced portions, to prevent the molten material passing through the gate well into the opening in the mold from leaking along the periphery of the cap past positions on the cap around the gate well and to provide for a shearing of the article in the mold, after hardening of the molten material, only at the position of the gate well.

33. A nozzle as set forth in claim 24, including, the cap being disposed in contiguous, but spaced, relationship to the mold in the vicinity of the opening in the mold when cold and when heated and being indented relative to the mold at positions between the opening in the mold and the spaced portions to provide heat insulation.

* * * * *